(12) United States Patent
Cohen et al.

(10) Patent No.: US 10,503,229 B2
(45) Date of Patent: *Dec. 10, 2019

(54) UNINTERRUPTIBLE POWER SUPPLY COMMUNICATION

(71) Applicant: SCHNEIDER ELECTRIC IT CORPORATION, West Kingston, RI (US)

(72) Inventors: Daniel C. Cohen, Newtonville, MA (US); James S. Spitaels, Shrewsbury, MA (US); Mark R. Melanson, Chelmsford, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 211 days.

This patent is subject to a terminal disclaimer.

(21) Appl. No.: 15/622,886

(22) Filed: Jun. 14, 2017

(65) Prior Publication Data
US 2017/0285707 A1    Oct. 5, 2017

Related U.S. Application Data

(63) Continuation-in-part of application No. 14/758,406, filed as application No. PCT/US2012/072288 on Dec. 31, 2012, now Pat. No. 10,088,883.

(51) Int. Cl.
*G06F 1/26*   (2006.01)
*G06F 1/3287*  (2019.01)
*H02J 9/06*   (2006.01)

(52) U.S. Cl.
CPC .............. *G06F 1/266* (2013.01); *G06F 1/263* (2013.01); *G06F 1/3287* (2013.01); *H02J 9/062* (2013.01)

(58) Field of Classification Search
CPC ........ G06F 1/263; G06F 1/266; G06F 1/3287; H02J 9/062
See application file for complete search history.

(56) References Cited

U.S. PATENT DOCUMENTS 9,231,439 B2    1/2016  Deokar et al.
10,088,883 B2 * 10/2018  Cohen ..................... G06F 1/263
(Continued)

FOREIGN PATENT DOCUMENTS

CN    101178775 A    5/2008
CN    101968838 A    2/2011
(Continued)

OTHER PUBLICATIONS

Extended European Search Report from corresponding European Application No. 18175598.4 dated Nov. 6, 2018.

*Primary Examiner* — Terrell S Johnson
(74) *Attorney, Agent, or Firm* — Lando & Anastasi, LLP

(57) ABSTRACT

According to one aspect, embodiments provide a UPS comprising an input configured to receive input power, a backup input configured to receive backup power from a backup power source, an output configured to provide output power, a communication stack including an external system interface configured to communicate with at least one external device, a local user interface including a switch, the switch having a first position corresponding to a filtering mode and a second position corresponding to a non-filtering mode, the switch being communicatively decoupled from the communication stack, and a controller configured to receive, through the communication stack, commands from an external entity, detect a position of the switch, identify, responsive to detection of the position of the switch corresponding to the filtering mode, that the commands are disallowed commands, and responsive to identifying the
(Continued)

disallowed commands, ignore the disallowed commands without executing the disallowed commands.

20 Claims, 7 Drawing Sheets

(56) References Cited

U.S. PATENT DOCUMENTS

| | | |
|---|---|---|
| 2003/0033548 A1 | 2/2003 | Kuiawa et al. |
| 2003/0233583 A1 | 12/2003 | Carley |
| 2005/0028017 A1 | 2/2005 | Janakiraman et al. |
| 2005/0206241 A1 | 9/2005 | Saxena et al. |
| 2005/0216626 A1 | 9/2005 | Tran et al. |
| 2006/0031476 A1 | 2/2006 | Mathes et al. |
| 2006/0167569 A1 | 7/2006 | Colombi et al. |
| 2008/0114999 A1 | 5/2008 | Terry et al. |
| 2009/0028227 A1 | 1/2009 | Nouis et al. |
| 2010/0019575 A1 | 1/2010 | Verges |
| 2010/0246101 A1 | 9/2010 | Deokar et al. |
| 2011/0314538 A1 | 12/2011 | Huang et al. |
| 2012/0032516 A1 | 2/2012 | Lee |
| 2012/0323381 A1 | 12/2012 | Yadav et al. |
| 2015/0338894 A1 | 11/2015 | Cohen et al. |

FOREIGN PATENT DOCUMENTS

| | | |
|---|---|---|
| CN | 102289608 A | 12/2011 |
| CN | 102362259 A | 2/2012 |
| CN | 102567669 A | 7/2012 |
| EP | 2421119 A2 | 2/2012 |
| WO | 2005091460 A2 | 9/2005 |
| WO | 2014105079 A1 | 7/2014 |

* cited by examiner ns setting, identify, based at least in part on the configuration setting, that a first subset of the commands are unrestricted commands and a second subset of the commands are restricted commands, and responsive to identifying the unrestricted commands, execute the unrestricted commands.

UNINTERRUPTIBLE POWER SUPPLY COMMUNICATION

CROSS-REFERENCE TO RELATED APPLICATION

This application is a continuation-in-part of U.S. patent application Ser. No. 14/758,406 filed on Jun. 29, 2015, titled UNINTERRUPTIBLE POWER SUPPLY COMMUNICATION, which is a National Phase of International Application No. PCT/US2013/077468, filed on Dec. 31, 2012, titled UNINTERRUPTIBLE POWER SUPPLY COMMUNICATION, both of which are hereby incorporated herein by reference in their entirety for all purposes.

FIELD OF THE INVENTION

The invention relates generally to uninterruptible power supplies.

BACKGROUND

The use of power devices, such as uninterruptible power supplies (UPSs), to provide regulated, uninterrupted power for sensitive and/or critical loads, such as computer systems and other data processing systems, is known. A number of different UPS products are available including those identified under the trade name SMART-UPS from APC by Schneider Electric, Inc. of West Kingston, R.I. In a typical UPS, a battery is used to provide backup power for a critical load during blackout or brownout conditions. A user of a typical UPS is able to configure and control the UPS either through a computer coupled to the UPS or through a user interface of the UPS itself. There are many different types of protocols for communicating between computer systems and uninterruptible power supplies (UPS) coupled to a communications network. Such networks may be, for example, point-to-point networks, shared networks such as busses, or any other media or network configuration type. Communications with a UPS on a network can include providing commands to the UPS and receiving data from the UPS, for example, monitoring UPS activity.

SUMMARY

Some commands received by an uninterruptible power supply (UPS) can be valid commands, for example, commands sent by an authorized user via a computer. Some commands can be malicious instructions, for example, sent by a virus or by a malicious user. In some embodiments, a UPS is configured to disallow or filter commands depending on a configuration of the UPS. For example, the UPS can have a security switch. In some embodiments, when the security switch is turned on, the UPS is configured to not allow some or all of the remote commands In other embodiments, the security switch enables filtering of commands, for example, to only allow certain remote commands In various embodiments, the UPS filters commands to allow remote commands that are properly encrypted or authenticated.

According to some embodiments, an uninterruptible power supply (UPS) includes an input configured to receive input power, a backup power source configured to provide backup power, an output configured to provide output power from at least one of the input power and the backup power, and a controller coupled to the input, the backup power source, and the output. The controller is configured to receive commands from an external entity, detect a configu- In some embodiments, the UPS further includes a hardware switch coupled to the controller, and the configuration setting corresponds to a position of the hardware switch.

In some embodiments, the UPS further includes a local user interface coupled to the controller, and the configuration setting corresponds to a selection on the local user interface.

In some embodiments, the first subset of commands comprises all the commands

In some embodiments, the second subset of commands comprises commands that are authenticated.

In some embodiments, the controller is further configured to discard, without executing, the second subset of commands.

In some embodiments, the second subset of commands comprises all the commands.

In some embodiments, the second subset of commands comprises a shutdown command.

In some embodiments, the second subset of commands comprises a command that changes the output power of the UPS.

In some embodiments, the second subset of commands comprises a command to change one or more configuration settings of the UPS.

In some embodiments, the second subset of commands comprises a command to transmit information from the UPS.

In some embodiments, the controller is further configured to store the second subset of commands and analyze the stored commands to identify an attack on the UPS.

In some embodiments, analyzing the stored commands includes at least one of detecting a pattern in the stored commands and receiving at least a threshold number of unauthorized commands.

According to some embodiments, a method for controlling an uninterruptible power supply (UPS) includes receiving commands at the UPS, from an external entity, detecting a configuration setting, identifying, based at least in part on the configuration setting, a first subset of the commands that are unrestricted commands and a second subset of the commands that are restricted commands, and responsive to identifying the unrestricted commands, executing the unrestricted commands.

According to some embodiments, a computer readable medium having stored thereon sequences of instruction includes instructions that will cause a processor to receive commands at a UPS, from an external entity, detect a configuration setting, identify, based at least in part on the configuration setting, that a first subset of the commands are unrestricted commands and a second subset of the commands are restricted commands, and responsive to identifying the unrestricted commands, execute the unrestricted commands.

According to some embodiments, a UPS includes an input configured to receive input power, a backup input configured to receive backup power from a backup power source, an output configured to provide output power from at least one of the input power and the backup power, a communication stack including an external system interface configured to communicate with at least one external device, a local user interface including a switch, the switch having a first position corresponding to a filtering mode and a second position corresponding to a non-filtering mode, the switch being communicatively decoupled from the communication stack, and a controller coupled to the input, the backup input, the output, the communication stack, and the local interface. The controller is configured to receive, through the communication stack, commands from an external entity, detect a position of the switch, identify, responsive to detection of the position of the switch corresponding to the filtering mode, that the commands are disallowed commands, and responsive to identifying the disallowed commands, ignoring the disallowed commands without executing the disallowed commands.

In some embodiments, the switch is a hardware switch coupled to the controller.

In some embodiments, the switch is a software switch.

In some embodiments, the external system interface includes at least one of a serial port, a Universal Serial Bus port, an Ethernet port, and a wireless connection.

In some embodiments, the controller is further configured to execute, responsive to identifying that the commands are allowed commands, the allowed commands.

In some embodiments, the switch is an out of band switch.

In some embodiments, the UPS is configured to communicate with at least one remote device through a network.

In some embodiments, at least one of the commands is a shutdown command.

In some embodiments, at least one of the commands changes an output power characteristic of the UPS.

In some embodiments, at least one of the commands changes one or more configuration settings of the UPS.

In some embodiments, at least one of the commands is a command to transmit information from the UPS through the communication stack.

In some embodiments, the controller further configured to store the commands, and analyze the stored commands to identify an attack on the UPS.

In some embodiments, analyze the stored commands comprises at least one of detect a pattern in the stored commands and receive at least a threshold number of unauthorized commands.

According to some embodiments, a method for controlling a UPS includes receiving commands at the UPS, from an external entity, detecting a position of a switch, the switch having a first position corresponding to a filtering mode and a second position corresponding to a non-filtering mode, identifying, responsive to detecting the position of the switch, that the received commands are disallowed commands, and responsive to identifying the disallowed commands, ignoring the disallowed commands without executing the disallowed commands.

In some embodiments, the method includes configuring a configuration setting responsive to detecting the position of a hardware switch on the UPS.

In some embodiments, the method includes configuring a configuration setting by setting a logical position of a software switch accessible through the UPS.

In some embodiments, the method includes executing, responsive to identifying that the received commands are allowed commands, the allowed commands.

In some embodiments, the method includes storing the received commands, and analyzing the stored commands to identify an attack on the UPS.

In some embodiments, analyzing the stored commands comprises at least one of detecting a pattern in the stored commands and receiving at least a threshold number of unauthorized commands.

According to some embodiments, a UPS includes an input configured to receive input power, a backup input configured to receive backup power from a backup power source, an output configured to provide output power from at least one of the input power and the backup power, a switch, and a controller coupled to the input, the backup power source, the switch, and the output. The controller is configured to receive commands from an external entity, detect a position of the switch, identify, responsive to detection of the position of the switch, that the commands are disallowed commands, and, responsive to identifying the disallowed commands, ignoring the disallowed commands without executing the disallowed commands.

Still other aspects, examples, and advantages of these exemplary aspects and examples, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any example disclosed herein may be combined with any other example in any manner consistent with at least one of the objects, aims, and needs disclosed herein, and references to "an example," "an embodiment," "some examples," "some embodiments," "other examples," "other embodiments," "an alternate example," "an alternate embodiment," "various examples," "various embodiments," "one example," "one embodiment," "at least one example," "at least one embodiment," "this and other examples," "this and other embodiments" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

In the drawings.

DETAILED DESCRIPTION

In some embodiments, an uninterruptible power supply (UPS) receives commands from a computer system. The UPS can parse and filter the commands For example, a user and/or developer can designate subsets of commands as unrestricted commands and restricted commands. The unrestricted commands can be allowed and executed as received. The restricted commands can be disallowed and discarded.

In some embodiments, the UPS can be delivered preconfigured to classify all commands as restricted commands In some embodiments, the restricted commands are executed if the restricted commands are properly authenticated. In some embodiments, a subset of commands can be designated to never be allowed when received from a computer system. In various embodiments, the filtering of commands is activated and deactivated based on a configuration setting. For example, the user can set a switch to a first position to activate the filtering of commands Various embodiments are described in greater detail below with reference to the figures.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other examples.

Also, the phraseology and terminology used herein is for the purpose of description and should not be regarded as limiting. Any references to examples or elements or acts of the apparatus and methods herein referred to in the singular may also embrace examples including a plurality of these elements, and any references in plural to any example or element or act herein may also embrace examples including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present apparatus and methods or their components to any one positional or spatial orientation.

Figure 1:
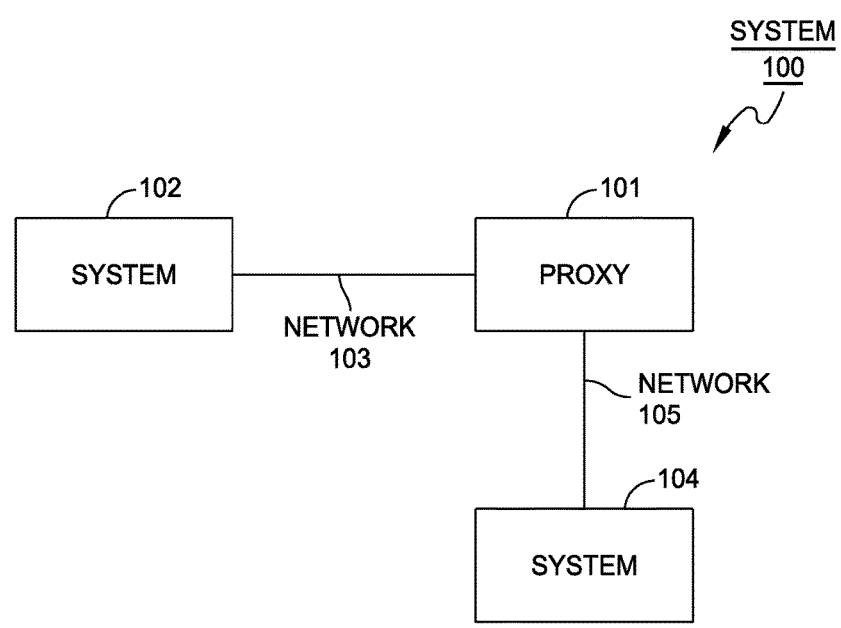
FIG. 1 is a block diagram of an example network system.

FIG. 1 is a block diagram of an example network system of some embodiments. In particular, the system 100 includes one or more systems connected by one or more networks. In the example shown, a system 102 is coupled to a proxy system 101 over a network 103. According to some embodiments, the proxy system 101 has a capability for communicating to the system 102 using a communication protocol. Communication with the system 102 may be useful, for example, for monitoring or managing a system 104 by the system 102. In an alternative configuration (not shown), the system 102 may be coupled directly to another system (e.g., system 104) or via a network (e.g., network 105). For example, in some embodiments, the system 102 is a computer and the system 104 is a UPS.

Further, according to some embodiments, the proxy system 101 translates requests from one or more systems (e.g., system 102) to requests that may be processed by the system 104. These requests may be, for example, messages generated by an application program executing on system 102. One example application program that may generate such requests is a management program that is provided for managing one or more systems (e.g., system 104). These requests may include control data used to control and configure system 104, requests for performance and/or status information from system 104, among others. To this end, proxy 101 may be capable of translating received management requests to messages that are capable of being processed by system 104. Although proxy 101 may be capable of communicating management data, it should be appreciated that proxy 101 may be capable of translating any type of request having any type of data.

In some embodiments, the proxy system 101 is coupled to more than one system. In one example, the proxy system 101 is coupled to two or more networks (e.g., network 103 and network 105). To this end, proxy 101 may have more than one network interface. Proxy 101 may also be capable of communicating using one or more communication protocols. Proxy 101 may also be incorporated in the system 104.

In some embodiments, the system 100 may exist as part of a remote computing infrastructure, such as a cloud computing infrastructure. For example, the system 102 may be located remote from the system 104, but may still monitor and control the system 104 remotely. As discussed in greater detail below, the system 102 and the system 104 may be implemented as entities in an Internet-of-Things (IoT) environment.

System 100 is merely an illustrative embodiment of a communication system in accordance with one embodiment. Any of numerous other implementations of the system (e.g., variations of 100 having more or less systems) are possible and are intended to fall within the scope of embodiments.

Various embodiments may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. In one specific embodiment, various aspects of a communication protocol are provided that may be used by computer systems such as micro-controllers or micro-processors. Such controllers may be embedded in one or more systems, such as, for example, an Uninterruptible Power Supply (UPS) or one of its components.

Figure 2:
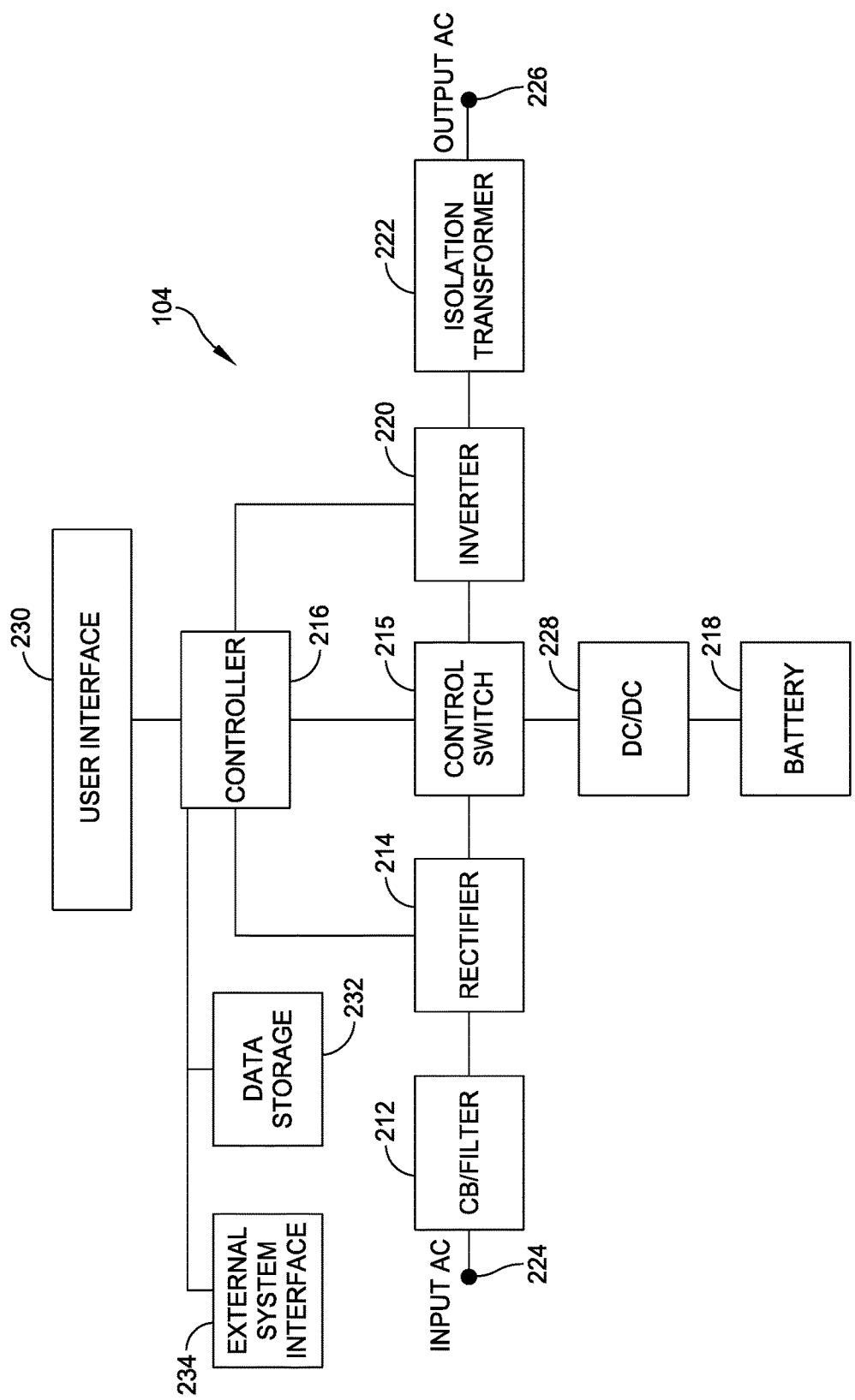
FIG. 2 is a block diagram of an example UPS.

In some embodiments, system 104 is a UPS. FIG. 2 shows an on-line UPS 104 used to provide regulated, uninterrupted power in accordance with one example in accordance with the present invention. The UPS 104 includes an input circuit breaker/filter 212, a rectifier 214, a control switch 215, a controller 216, a battery 218, an inverter 220, an isolation transformer 222, a DC/DC converter 228, a user interface (UI) 230, data storage 232 and external system interface 234. The UPS also includes an input 224 for coupling to an AC power source, and an outlet 226 for coupling to a load.

The UPS 104 operates as follows. The circuit breaker/filter 212 receives input AC power from the AC power source through the input 224, filters the input AC power and provides filtered AC power to the rectifier 214. The rectifier 214 rectifies the input voltage. The DC/DC converter 228 regulates DC power from the battery 218. The control switch 215 receives the rectified power and also receives the DC power from the DC/DC converter 228. The controller 216 determines whether the power available from the rectifier 214 is within predetermined tolerances, and if so, controls the control switch 215 to provide the power from the rectifier 214 to the inverter 220. If the power from the rectifier 214 is not within the predetermined tolerances, which may occur because of "brown out" or "black out" conditions, or due to power surges, then the controller 216 controls the control switch 215 to provide the DC power from the DC/DC converter 228 to the inverter 220.

The inverter 220 of the UPS 104 receives DC power and converts the DC power to AC power and regulates the AC power to predetermined specifications. The inverter 220 provides the regulated AC power to the isolation transformer 222. The isolation transformer 222 is used to increase or decrease the voltage of the AC power from the inverter 220 and to provide isolation between a load and the UPS 104. The isolation transformer 222 is an optional device, the use of which is dependent on UPS output power specifications. Depending on the capacity of the battery 218 and the power requirements of the load, the UPS 104 can provide power to the load during brief power source dropouts or for extended power outages.

Specific examples in accordance with the present invention include several variations of the UPS 104. For instance, in one example, the UPS 104 is configured to accept and distribute polyphase power, such as three phase power. In some examples, the outlet 226 includes a plurality of physical outlet groups, each of which includes a plurality of physical outlets. In other examples, the UPS 104 is configured to monitor and record, in data storage 232, the amount of power supplied via these outlet groups and outlets. In other examples, the UPS 104 is a standby UPS. In other examples, the UPS 104 is a line interactive UPS.

Returning to the example of FIG. 2, the controller 216 monitors and controls operation of the UPS 104. Using data stored in associated memory, the controller 216 also performs one or more instructions that may result in manipulated data. In some examples, the controller 216 may include one or more processors or other types of controllers. In one example, the controller 216 is a commercially available, general purpose processor. In another example, the controller 216 performs a portion of the functions disclosed herein on a general purpose processor and performs another portion using an application-specific integrated circuit (ASIC) tailored to perform particular operations. As illustrated by these examples, examples in accordance with the present invention may perform the operations described herein using many specific combinations of hardware and software and the invention is not limited to any particular combination of hardware and software components.

The data storage 232 stores computer readable information required for the operation of the UPS 104. This information may include, among other information, data subject to manipulation by the controller 216 and instructions that are executable by the controller 216 to manipulate data. Thus, in some embodiments, the data storage 232 can receive and store or retrieve and provide this computer readable information. The data storage 232 may include relatively high performance, volatile, random access memory such as a dynamic random access memory (DRAM) or static memory (SRAM) or may include a nonvolatile storage medium such as read-only memory (ROM), magnetic disk, flash memory, CD, DVD or one or more electrical switches, such as a dip switch. In one example, the data storage 232 includes both volatile and non-volatile storage. Various examples in accordance with the present invention can organize the data storage 232 into particularized and, in some cases, unique structures to perform the aspects and functions disclosed herein. In addition, these data structures may be specifically configured to conserve storage space or increase data exchange performance.

In one example, the data storage 232 includes data structures that house system information regarding the UPS 104 and devices coupled to it. Examples of system information are discussed below and include, among other information, configuration management information and performance information. The devices that may be coupled to the UPS 104 include any electronic device that requires power to function, such as, among others, computers, printers, routers, switches, automatic transfer switches and air conditioning units. Some devices may also include communication components, such as Ethernet or USB interfaces, that can be coupled to the UPS 104 via external system interface 234 to allow for enhanced communication between the device and the UPS 104.

Configuration management information may be any information that can be used to indentify attributes of the UPS 104 or other devices. Examples of configuration management information specific to a device include, among other information, manufacturer, model, serial number and version. In addition, configuration management information may also include manufacturer, model, serial number and version information for components included in the device, such as software installed on the device or identifiable hardware elements within the device.

Performance information may be any information that characterizes the operation of the UPS 104 or other devices. Examples of performance information include, among other information, device uptime information, operational logs and power consumption information. Power consumption information may include listed, i e nameplate, values and actual measured values for power consumption of the device.

The external system interface 234 exchanges data with one or more external devices. These external devices may include any device configured to communicate using standards and protocols supported by the UPS 104. Examples of specific standards and protocols that the external system interface 234 may support include parallel, serial, and USB interfaces. Other examples of these supported protocols and standards include networking technologies such as UDP, TCP/IP and Ethernet technologies. In at least some examples, the external system interface 234 includes a network management card (NMC) and a USB interface. In these examples, the external system interface 234 can receive or transmit data using either or both of these conduits.

The user interface 230 includes a display screen and a set of keys through which a user of the UPS 104 can monitor, control and configure operation of the UPS 104. In some embodiments, the user interface 230 includes a power button, a replace battery indicator, a warning indicator, an on-battery power indicator, an on-line power indicator, an interface display, a scroll up button, a scroll down button, an enter button, and an escape button.

Figure 3:
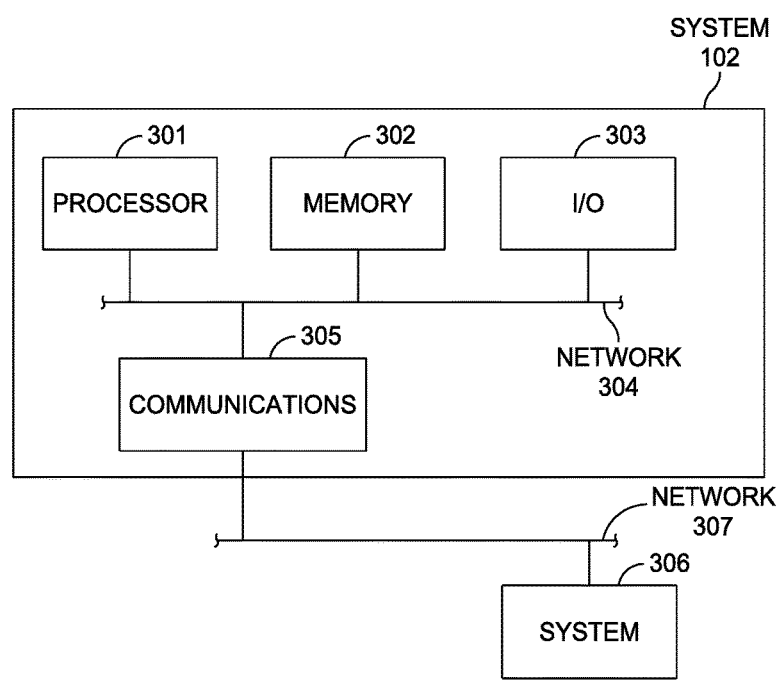
FIG. 3 is a block diagram of an example computer system.

Referring to FIG. 3, a general-purpose computer system according to some embodiments is configured to perform any of the functions described herein including, but not limited to, communicating between computer systems and/or relaying data to other systems (e.g., system 306). The system may perform other functions, and the embodiments are not limited to having any particular function or set of functions. Various entities such as, for example, systems 102, 104 and proxy 101 may be general-purpose computer systems that implement various communication functions according to various embodiments.

For example, various embodiments may be implemented as specialized software executing in a general-purpose computer system 102 such as that shown in FIG. 3. The computer system 102 may include a processor 301 connected to one or more memory devices 302, such as a disk drive, memory, or other device for storing data. Memory 302 is typically used for storing programs and data during operation of the computer system 102. Components of the computer system 102 may be coupled by an interconnection mechanism (e.g., network 304), which may include one or more busses (e.g., between components that are integrated within a same machine) and/or a network (e.g., between components that reside on separate machines).

The interconnection mechanism 304 enables communications (e.g., data, instructions) to be exchanged between system components of system 102. System 102 also includes one or more I/O devices 303 (e.g., ports, devices, systems, etc.) for inputting and outputting data. In addition, system 102 may contain one or more interfaces 305 that connect computer system 102 to a communication network 307.

According to some embodiments, interface 305 may be a serial-type interface that is used to communicate to an attached device. The interface 305 may be capable of communicating using various embodiments. Such an interface 305 may use one or more serial-type transport layer protocols including, but not limited to, TTL serial, RS-232, RS-422, RS-485, I2C, CAN, USB, or any other transport layer capable of moving packets between systems. In some embodiments, the interface 305 may be an Ethernet interface. In some embodiments, the interface 305 may be a wireless interface.

Figure 4:
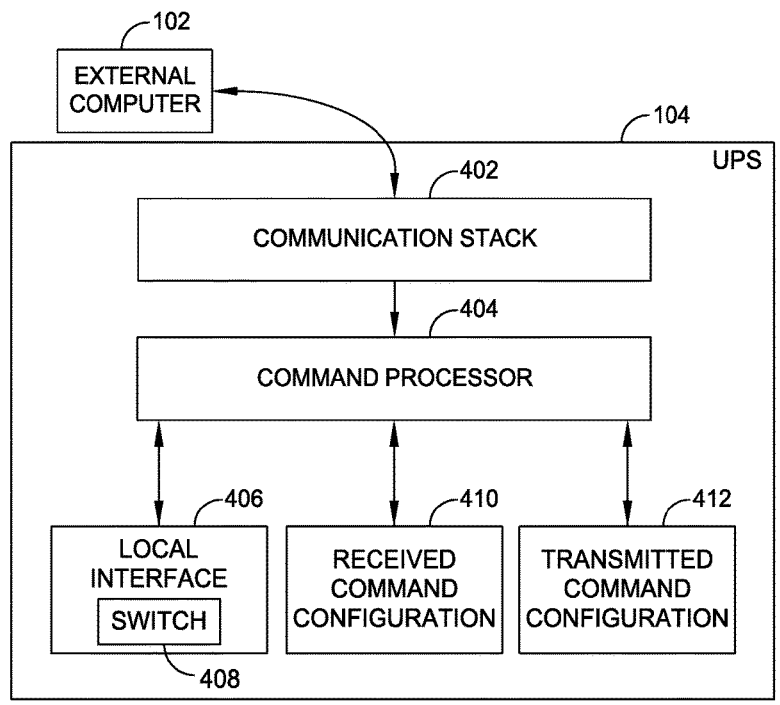
FIG. 4 is a block diagram of an example UPS and computer system.

FIG. 4 shows a block diagram 400 including the UPS 104. In some embodiments, the computer system 102 communicates with the UPS 104 to monitor and manage the UPS 104. As discussed above, the computer system 102 can be connected directly to the UPS 104, via a network, and/or via other intervening systems. The computer system 102 may be configured to monitor and control the UPS 104, such as in an IoT environment, transmit commands to be executed by the UPS 104, and receive messages and data from the UPS 104. The messages can include acknowledgment messages from the UPS 104, for example, when the UPS 104 successfully receives or executes a command transmitted by the computer system 102. The data can include UPS environment data, for example, information used by the computer system 102 to monitor the UPS 104 and how the UPS 104 is operating. For example, the UPS environment data can include information such as remaining battery capacity, input power source, power quality, power output, temperature, and other information that can be provided by a UPS to a user.

In some embodiments, the UPS 104 includes a communication stack 402. The communication stack 402 can include various ports, hardware, software, and protocols that allow the UPS 104 to communicate with external systems. The communication stack 402 can include the external system interface 234 described above with reference to FIG. 2. For example, the communication stack can include a serial port, a USB port, an Ethernet port, a wireless connection, and/or other appropriate ports, along with corresponding software and protocols to communicate with the computer system 102.

In some embodiments, the communication stack receives the command and relays the command to a command processor 404. The command processor 404 can include a general-purpose processor, as described above. The UPS 104 also includes a local interface 406. The local interface 406 can include the user interface 230 described above with reference to FIG. 2. The UPS 104 can receive information via the local interface 406 to determine whether or not to filter commands The local interface 406 can be used to modify a configuration setting to determine whether the UPS 104 filters commands. For example, the local interface may include a switch 408 and the configuration setting can be modified by the switch 408. The user can turn on filtering by setting the switch 408 to a first position (e.g., an on position). The switch 408 can be a hardware switch (e.g., a dip switch) or a software switch. In some embodiments, the local interface 406 consists solely of the switch 408. In some embodiments, the local interface 406 is not coupled to any networks (e.g., remote communication networks) and external systems. The switch 408 can be configured to be accessible only via the local interface 406, such that malicious users, software, viruses, or commands cannot modify or access the switch setting remotely. In this respect, the switch 408 is an "out of band" switch that can only be manipulated by a user that is physically present where the switch 408 is implemented. In some embodiments, the switch 408 is a key switch such that even with physical access to the UPS 104, a fitting key is needed to change the setting of the switch 408. Other appropriate access control methods can be used to prevent unauthorized changing of the configuration setting, such as usernames and username-password combinations.

In some embodiments, the UPS 104 also includes a received command configuration 410, which the UPS 104 can use to determine whether a received command is authorized. The received command configuration 410 is a configuration that can be determined by the user or a developer. In some embodiments, the received command configuration 410 includes a subset of commands that are authorized. For example, in some embodiments, the UPS 104 can disallow a shutdown command and allow all other commands In some embodiments, the UPS 104 can disallow a subset of commands deemed mission critical by a user and allow all other commands In some embodiments, the received command configuration 410 authorizes no commands In some embodiments, the received command configuration 410 authorizes all commands. Commands include UPS-specific commands, such as self-testing, testing a battery, routing power from different power sources, shutting off power to a load, changing configuration settings (e.g., acceptable power quality settings). Commands also include requests for information, such as environment data.

The received command configuration 410 allows commands that are properly encrypted or authenticated. For example, the received command configuration 410 can authorize commands received with an authentication code and/or encrypted using an authentication code. The authentication code can be a password determined by the user and/or a code found on the UPS 104, such that users with physical access to the UPS 104 can obtain the code. In some embodiments, the authentication code can be requested by the UPS 104 upon receiving a command in a subset of commands requiring proper authentication. In some embodiments, the UPS 104 can provide a time window in which the user can provide the authentication code. In some embodiments, the UPS 104 can disallow the command for a time period upon one or more failed attempts to provide the authentication code. The time period can be constant or varying with multiple failures and/or require a local reset.

The received command configuration 410 can allow commands based on the interface through which the command was received. For example, the received command configuration 410 can allow commands received via the local interface 406 and the USB and serial ports and not allow commands received through Ethernet.

The received command configuration 410 can use a combination of these configurations. For example, the received command configuration 410 can allow a first subset of commands and allow a second subset of commands only if the command is properly authenticated and disallow a third subset of commands In various embodiments, other appropriate combinations and/or configurations can be determined by the user. In some embodiments, the UPS 104 can provide a plurality of predetermined configurations with varying levels of security for the user to select as the received command configuration 410. For example, the switch 408 can have multiple settings, which correspond to each of the predetermined configurations of varying levels of security. Alternatively or additionally, each of the switch settings can correspond to customized configurations. In some embodiments, the number of settings of the switch is configurable by the user.

In some embodiments, the UPS 104 includes a transmitted command configuration 412, which the UPS 104 can use to determine whether responses generated by the UPS 104 are authorized to be transmitted. Transmissions can include responses, such as acknowledgement of commands and confirming execution of commands Transmissions can also include reports, such as load information and time of day. Transmissions can be restricted to prevent private information from being reported and/or intercepted by malicious users. The transmitted command configuration 412 can operate with the UPS 104 in a similar manner as the received command configuration 410. In some embodiments, the transmitted command configuration 412 allows all transmissions, including responses and reports. In some embodiments, the transmitted command configuration 412 allows a subset of transmissions and disallows a second subset of transmissions. In some embodiments, the transmitted command configuration 412 can request an authentication code to allow all or a subset of transmissions. In some embodiments, the transmitted command configuration 412 can allow transmissions to a subset of interfaces and disallow transmissions to a second subset of interfaces. In some embodiments, combinations of these configurations are used.

Figure 5:
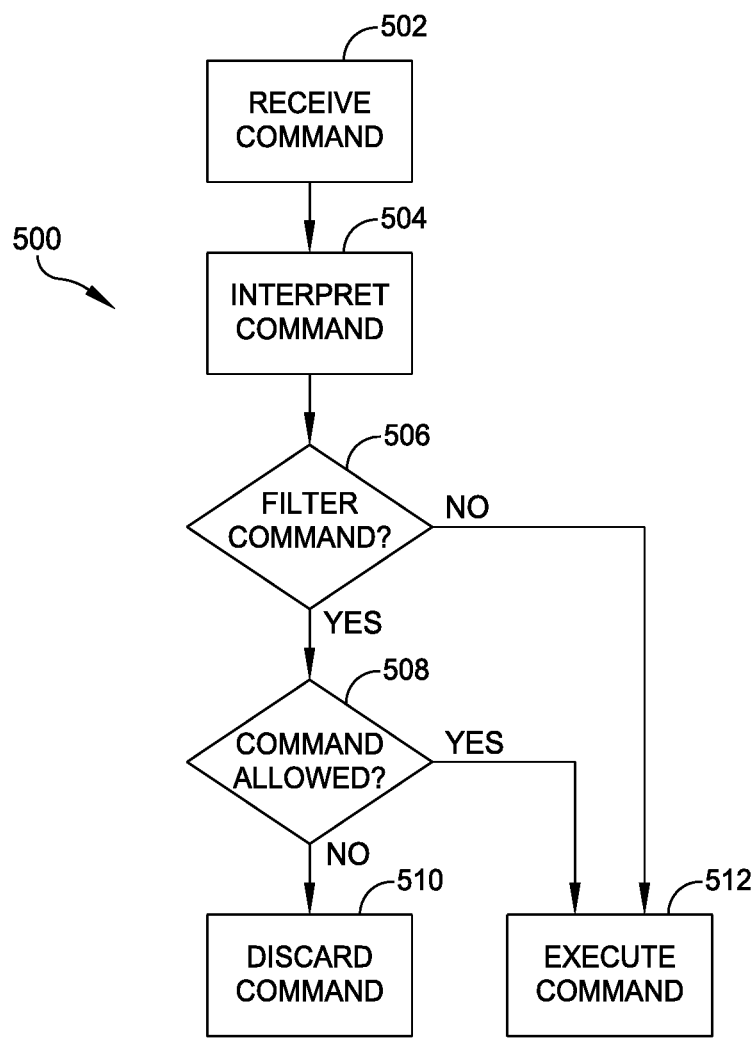
FIG. 5 is a flow chart of an example process implemented by a UPS.

FIG. 5 shows an example process 500, which can be executed, for example, on the UPS 104. The UPS 104 receives a command from the computer system 102 at act 502. The command can be received by the communication stack 402 of the UPS 104.

The communication stack 402 can route the command to the command processor 404, where the command is interpreted at act 504. A configuration setting can determine whether commands are filtered. When the configuration setting is set to not filtering (e.g., the switch 408 is set to an off position or a second position), the command processor 404 allows all commands When the command interpreter allows all commands, the command processor 404 can route the commands directly to appropriate modules for execution by the UPS 104.

When the configuration setting is set for filtering commands, the command is filtered at act 506. In these embodiments, the command is parsed and a subset of commands is executed by the UPS 104 at act 512. For example, a subset of commands can be predetermined to be unrestricted and always allowable. Unrestricted commands can include commands determined not to affect critical operations of the UPS 104. In some embodiments, unrestricted commands include commands such as requesting data, blinking light emitting diode (LED) indicators on the UPS 104. In other embodiments, the subset of unrestricted commands includes no commands. The commands that are considered unrestricted can be determined by a developer. In some embodiments, the UPS 104 can provide a plurality of predetermined subsets with varying levels of security for the user to select as the subset of commands that are unrestricted, restricted (subject to authentication), and restricted (not subject to authentication). The predetermined subsets can be selected by setting a switch with multiple positions, each position corresponding to one of the plurality of predetermined subsets of commands.

If the command is filtered at act 506 and determined to be in a subset of restricted commands, at act 508 the UPS 104 determines whether the command is authorized based on the received command configuration 410. The filtering of commands and the authorizing of commands can be combined. For example, commands that are unrestricted can be considered a subset of commands that are always authorized by the UPS 104.

If the UPS 104 disallows a command, the command is discarded at act 510. The command can be discarded by ignoring the command In some embodiments, the UPS 104 can record discarded commands, for example, to a file. The UPS 104 can provide the file of recorded discarded commands to a user upon user request and/or at periodic intervals.

In some embodiments, the UPS 104 includes an attack detection algorithm. The attack detection algorithm can include viewing the recorded discarded commands for an indication that the UPS 104 is being attacked by a malicious entity. The indication can include a pattern of received commands, a number of received commands, a frequency of received commands, failed authentication attempts, and/or other signs that the UPS 104 is under attack. For example, the pattern of received commands can include one or more of predetermined sequences of commands, a regularity in periodicity of received commands, sources of commands, and/or other appropriate patterns. In some embodiments, the attack detection algorithm notifies the user of a suspected attack when an attack is detected. In some embodiments, the attack detection algorithm changes the received command configuration 410 if an attack is detected. The attack detection algorithm can change the received command configuration 410 to allow no commands when the UPS 104 is determined to be under attack. Alternatively or additionally, the attack detection algorithm can change the received command configuration 410 to configurations of varying levels of security depending on the perceived threat and/or the current configuration setting. In some embodiments, the attack detection algorithm can restore the received command configuration 410 to an original setting based on determining that the attack has ended. In some embodiments, the attack detection algorithm can restore the received command configuration 410 to an original setting after a predetermined time period. In some embodiments, a local reset can be required. The local reset can include an entering of a password and/or authentication code at the local interface 406. The local reset can include a resetting of the switch or configuration setting, and/or other appropriate access control methods. If the UPS 104 allows a command, the command is executed at act 512.

The process 500 is particularly advantageous to an end user where the user is able to access and modify the received command configuration 410, because the end user is able to control which commands are restricted. In some examples, however, a user may be unable to access the received command configuration 410, such as where the UPS 104 is implemented in an Internet-of-Things (IoT) environment.

An IoT environment includes a plurality of inter-networked devices which can communicate with each other directly or indirectly through a network to optimize the behavior of the IoT devices. In some embodiments, it may be advantageous to implement at least one of the IoT devices as a constrained device. A constrained device is a simple, low-complexity device connected to a higher-complexity device within the IoT environment. The higher-complexity device controls the constrained device and executes computationally-burdensome tasks on behalf of the constrained device, which provides several advantages such as those described in co-pending U.S. patent application Ser. No. 15/622,478, which is herein incorporated by reference in its entirety. Unconstrained devices, such as those that perform a substantial portion of high- and low-complexity tasks locally, also benefit from implementation in IoT environments.

Although IoT environments provide many advantages, an end user utilizing the IoT device may be required to sacrifice some control over the IoT device to other devices in the IoT environment. For example, the end user may not be able to control the received command configuration 410 because it is under the control of a higher-complexity device controlling the IoT device. The end user often does not have access to the higher-complexity device, which may be located remote from the IoT device. In many cases, the end user may not even know who owns and/or controls the higher-complexity device. Another issue is that, where the IoT device is a constrained device, the constrained device may be designed with such minimal sophistication that it does not include a user interface through which an end user can modify high-level settings on the constrained device. Each of the foregoing scenarios is problematic to some end users because they do not have full control over the operation of the IoT device, whether the device is constrained or unconstrained. Similar problems also arise when the device is not an IoT device but is instead, for example, a device connected to a Local Area Network (LAN).

Accordingly, it would be advantageous to provide a device with a local configuration setting pre-configured to disallow all received commands when the configuration setting is activated, without requiring modification of the received command configuration 410. In this capacity, the end user has greater control over the commands being executed by the device. The end user can allow or disallow all commands without being concerned with which commands are restricted or unrestricted, because all commands are automatically classified as restricted.

The configuration setting can be designed for easy actuation by a user, without requiring interaction with a sophisticated user interface. For example, where the device is implemented as a UPS, such as the UPS 104 described above with respect to FIG. 2, the UPS could include a simple switch corresponding to the configuration setting. In a first switch position, the UPS allows all commands received from external devices. In a second switch position, the UPS disallows all commands The UPS can be delivered to the end user pre-configured to allow all or none of the commands depending on the state of the switch, and does not require manipulation of a command configuration such as the received command configuration 410 to decide which commands are allowed and which are disallowed.

Figure 7:
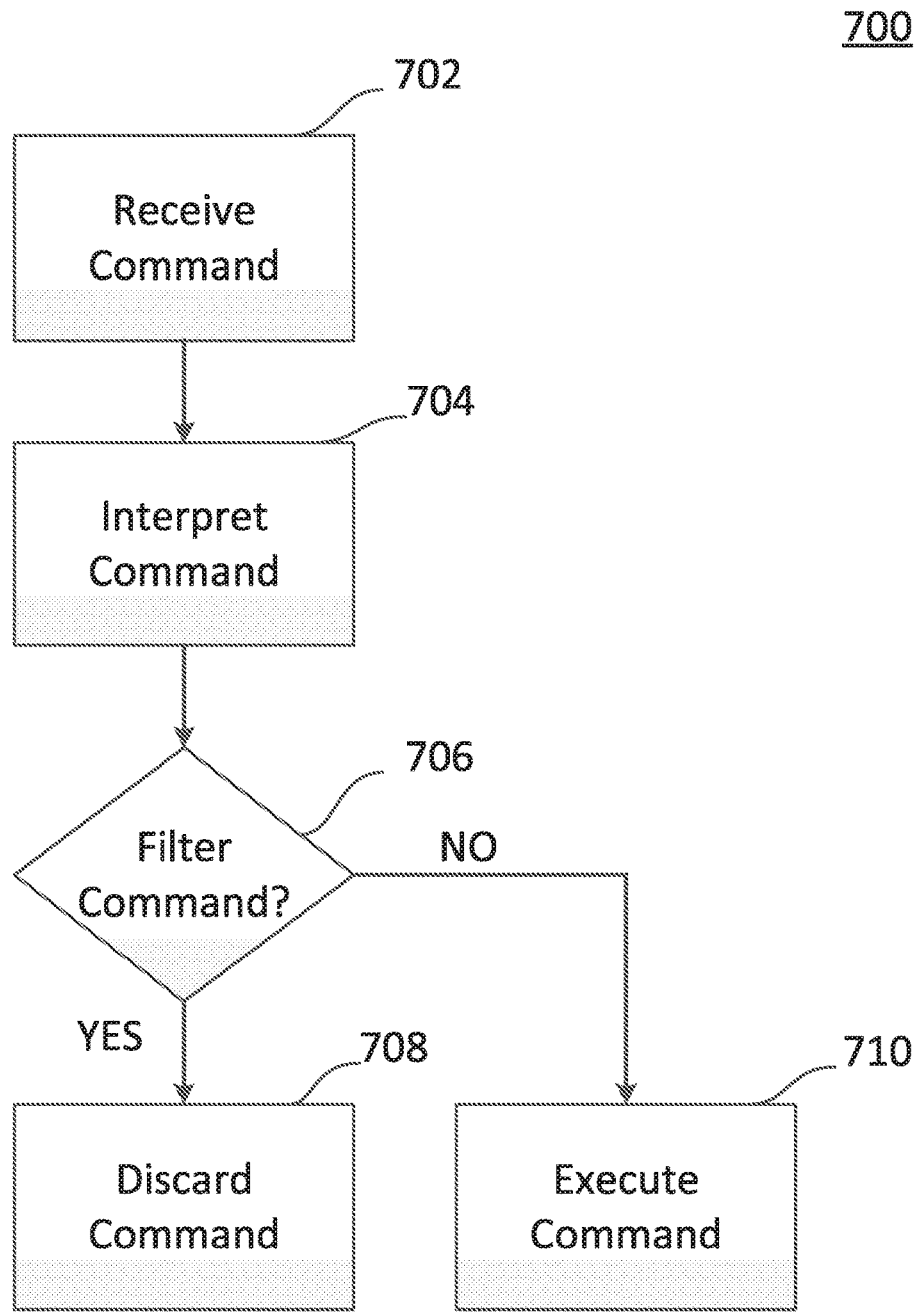
FIG. 7 is a flow chart of an example process implemented by a UPS.

FIG. 7 illustrates a process 700 which can be executed, for example, on the UPS 104. The UPS 104 receives a command from the computer system 102 at act 702. The command can be received by the communication stack 402 of the UPS 104. The communication stack 402 can route the command to the command processor 404, where the command is interpreted at act 704. A configuration setting can determine whether commands are filtered at act 706.

When the configuration setting is set to not filtering (e.g., when the switch 408 is set to an off position or a second position), the command processor 404 allows all commands from a remote device to be received and executed. When the command processor 404 allows all commands (706 NO), the command processor 404 can route the commands directly to appropriate modules for execution by the UPS 104, and the commands are executed at act 710.

When the configuration setting is set to filtering (e.g., when the switch 408 is set to an on position or a first position), the command processor 404 disallows all commands When the command processor 404 disallows all commands (706 YES), the command processor 404 can discard all commands without executing them at act 708. The command can be discarded by ignoring the command In some embodiments, the UPS 104 can record discarded commands, for example, to a file. The UPS 104 can provide the file of recorded discarded commands to a user upon user request and/or at periodic intervals.

Figure 6:
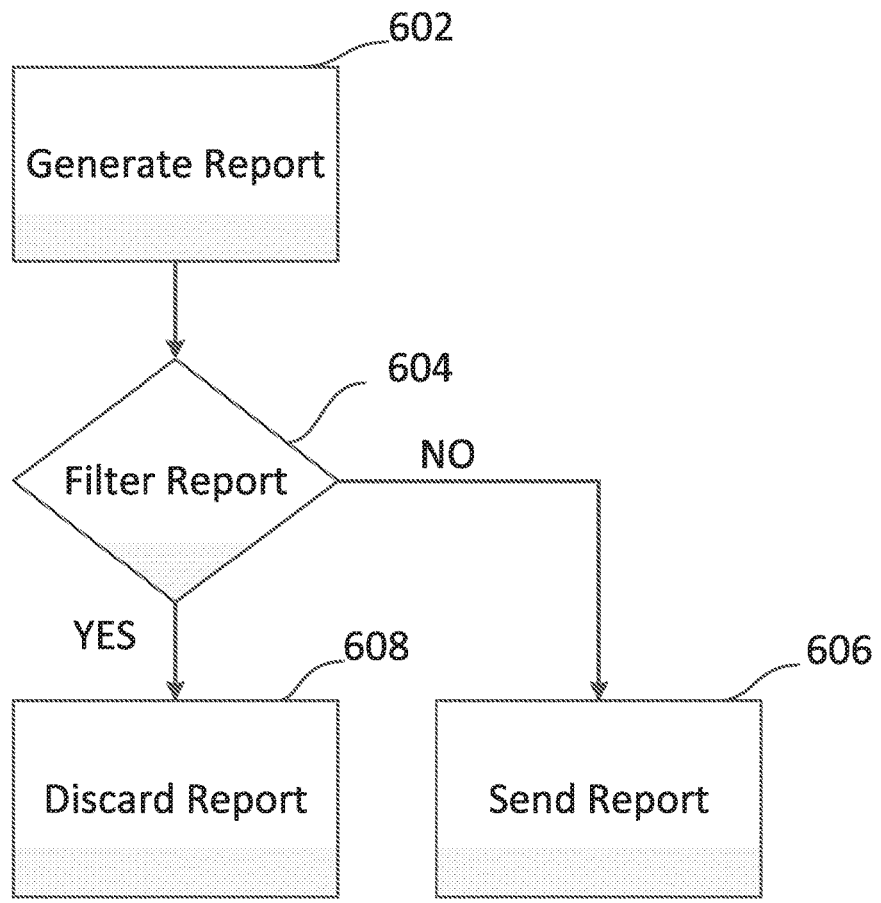
FIG. 6 is a flow chart of an example process implemented by a UPS according to embodiments of the present disclosure.

In any of the foregoing examples, the UPS 104 can generate responses to commands and other data reports, such as environment data. FIG. 6 shows an example process 600, which can be executed, for example, on the UPS 104. At act 602, the UPS 104 can generate a report. The report can include environment information, such as information about loads and power provided by the UPS 104. At act 604, the report is filtered. The UPS 104 can determine whether the response is authorized based on the transmitted command configuration 412. In some embodiments, the transmitted command configuration 412 can change corresponding to the security level of the received command configuration 410, for example, if an attack is detected.

If the transmission is allowed, at act 606, the response is relayed to the communication stack 402 of the UPS 104, which transmits the response to the computer system 102. If the transmission is disallowed, at act 608, the transmission is discarded. Discarded transmissions can be ignored or recorded, such as in a memory or to a file on a physical memory store. The discarded transmissions can also be used by the attack detection algorithm to determine indications of attacks by malicious entities.

While the system has been described with reference to users and developers, the actions described to be performed by users can be taken by developers and vice versa. In some embodiments, users and developers can refer to the same entities.

System 102 includes a storage mechanism as a part of memory 302 or other storage that includes computer readable and writeable nonvolatile recording media in which signals are stored that define a program to be executed by the processor or information stored on or in the medium to be processed by the program. The medium may, for example, be a disk, flash memory, EEPROM, RAM, or the like. In operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). This memory may be located in a storage system, or in memory system 302.

The processor 301 generally manipulates the data within the memory and then copies the data to the medium after processing is completed. A variety of mechanisms are known for managing data movement between the medium and the memory elements, and embodiments are not limited thereto. It should be appreciated that embodiments are not limited to a particular memory system or storage system.

The computer system may include specially-programmed, special-purpose hardware, for example, an application-specific integrated circuit (ASIC). Embodiments may be implemented in software, hardware or firmware, or any combination thereof. Further, such methods, acts, systems, system elements and components thereof may be implemented as part of the computer system described above or as an independent component.

Although computer system 102 is shown by way of example as one type of computer system upon which various embodiments may be practiced, it should be appreciated that aspects are not limited to being implemented on the computer system as shown in FIG. 3. Various aspects may be practiced on one or more computers having a different architecture or components that that shown in FIG. 3.

System 102 may be a general-purpose computer system that is programmable using a high-level computer programming language. System 102 may be also implemented using specially programmed, special purpose hardware. In the computer system 102, processor 301 is typically a commercially available processor such as the well-known Pentium class processor available from the Intel Corporation. Many other processors are available. Such a processor usually executes an operating system which may be, for example, the Windows NT, Windows 2000 (Windows ME) or Windows XP operating systems available from the Microsoft Corporation, MAC OS System X available from Apple Computer, the Solaris Operating System available from Sun Microsystems, Linux, or UNIX available from various sources. Many other operating systems may be used.

The processor and operating system together define a computer platform for which application programs in high-level programming languages are written. It should be understood that embodiments are not limited to a particular computer system platform, processor, operating system, or network. Also, it should be apparent to those skilled in the art that embodiments are not limited to a specific programming language or computer system. Further, it should be appreciated that other appropriate programming languages and other appropriate computer systems could also be used.

It should be appreciated that embodiments are not limited to executing on any particular system or group of systems. Also, it should be appreciated that embodiments are not limited to any particular distributed architecture, network, or communication protocol.

Various embodiments may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects may be implemented as programmed or non-programmed elements, or any combination thereof.

According to some embodiments, UPSs communicate to a management entity using a directly-connected link (e.g., a serial communication cable or a USB cable) or are provided what is referred herein as a network management card (NMC), interface card, or other devices that communicate to the device using the native language of the device, and this device translates data to one or more other systems or devices using network protocols such as HTTP (e.g., over one or more networks). Ethernet and/or other local area networks can be interfaced directly to the UPS or indirectly through a proxy such as the NMC or other devices.

Products such as UPSs and other devices can communicate to other devices over an Ethernet-based network through either of two methods. First, an interface card (e.g., an NMC), communicates to the UPS or other device in the native language of the UPS or other device, translates this data to client-friendly terminology and vocabulary, and communicates over the Ethernet-based network to one or more other devices (e.g., a client) using one of many protocols such as HTTP, Telnet, SNMP and others. A client interpreting the translated data can be a human using a network browser or an application programmed to implement processes in response to the UPS or other devices' state of condition. The interface card may also be integrated with the UPS controller. Another way by which a connection is formed includes a software application installed in a computer that connects to the UPS or other device through a serial connection, translates the UPS or other device data to client-friendly terms and makes that data available to other devices through an Ethernet-based network connection.

Having thus described several aspects of at least one embodiment of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

What is claimed is:

1. An Uninterruptible Power Supply (UPS) comprising:
an input configured to receive input power;
a backup input configured to receive backup power from a backup power source;
an output configured to provide output power from at least one of the input power and the backup power;
a communication stack including an external system interface configured to communicate with at least one external device;
a local user interface including a switch, the switch having a first position corresponding to a filtering mode and a second position corresponding to a non-filtering mode, the switch being communicatively decoupled from the communication stack; and
a controller coupled to the input, the backup input, the output, the communication stack, and the local interface, the controller configured to:
receive, through the communication stack, commands from an external entity;
detect a position of the switch;
identify, responsive to detection of the position of the switch corresponding to the filtering mode, that the commands are disallowed commands; and
responsive to identifying the disallowed commands, ignore the disallowed commands without executing the disallowed commands.

2. The UPS of claim 1, wherein the switch is a hardware switch coupled to the controller.

3. The UPS of claim 1, wherein the switch is a software switch.

4. The UPS of claim 1, wherein the external system interface includes at least one of a serial port, a Universal Serial Bus port, an Ethernet port, and a wireless connection.

5. The UPS of claim 1, wherein the controller is further configured to execute, responsive to identifying that the commands are allowed commands, the allowed commands.

6. The UPS of claim 1, wherein the switch is an out of band switch.

7. The UPS of claim 1, wherein the UPS is configured to communicate with at least one remote device through a network.

8. The UPS of claim 1, wherein at least one of the commands is a shutdown command.

9. The UPS of claim 1, wherein at least one of the commands changes an output power characteristic of the UPS.

10. The UPS of claim 1, wherein at least one of the commands changes one or more configuration settings of the UPS.

11. The UPS of the claim 1, wherein at least one of the commands is a command to transmit information from the UPS through the communication stack.

12. The UPS of claim 1, the controller further configured to:
store the commands; and
analyze the stored commands to identify an attack on the UPS.

13. The UPS of claim 12, wherein analyze the stored commands comprises at least one of detect a pattern in the stored commands and receive at least a threshold number of unauthorized commands.

14. A method for controlling an Uninterruptible Power Supply (UPS), the method comprising:
receiving commands at the UPS, from an external entity;
detecting a position of a switch, the switch having a first position corresponding to a filtering mode and a second position corresponding to a non-filtering mode;
identifying, responsive to detecting the position of the switch, that the received commands are disallowed commands; and
responsive to identifying the disallowed commands, ignoring the disallowed commands without executing the disallowed commands.

15. The method of claim 14, further comprising configuring a configuration setting responsive to detecting the position of a hardware switch on the UPS.

16. The method of claim 14, further comprising configuring a configuration setting by setting a logical position of a software switch accessible through the UPS.

17. The method of claim 14, further comprising executing, responsive to identifying that the received commands are allowed commands, the allowed commands.

18. The method of claim 14, further comprising:
storing the received commands; and
analyzing the stored commands to identify an attack on the UPS.

19. The method of claim 18, wherein analyzing the stored commands comprises at least one of detecting a pattern in the stored commands and receiving at least a threshold number of unauthorized commands.

20. An Uninterruptible Power Supply (UPS) comprising:
an input configured to receive input power;
a backup input configured to receive backup power from a backup power source;
an output configured to provide output power from at least one of the input power and the backup power;
a switch; and
a controller coupled to the input, the backup input, the switch, and the output, the controller configured to:
receive commands from an external entity;
detect a position of the switch;
identify, responsive to detection of the position of the switch, that the commands are disallowed commands; and
responsive to identifying the disallowed commands, ignore the disallowed commands without executing the disallowed commands.

* * * * *